Dec. 3, 1968

M. PETRICK 3,414,744

MAGNETOHYDRODYNAMIC GENERATOR

Filed Dec. 3, 1965

INVENTOR.
Michael Petrick

United States Patent Office 3,414,744
Patented Dec. 3, 1968

3,414,744
MAGNETOHYDRODYNAMIC GENERATOR
Michael Petrick, Joliet, Ill., assignor to the United States of America as represented by the United States Atomic Energy Commission
Filed Dec. 3, 1965, Ser. No. 511,565
6 Claims. (Cl. 310—11)

The invention described herein was made in the course of, or under, a contract with the United States Atomic Energy Commission.

This invention relates to a magnetohydrodynamic (MHD) generator for thermal-electric power conversion. In more detail, the invention relates to a two-phase, liquid-metal MHD generator.

For all practical purposes, effective further development of the steam cycle and steam turbines appears to be rapidly nearing an end. Accordingly, a large amount of effort has been and is being expended on a search for new or unconventional power systems which can meet the ever-increasing demand for additional power more efficiently and economically than those heretofore used. Although it has been known for many years that electrical energy can be generated by moving a conducting fluid through a magnetic field, no practical application of this phenomenon has yet been developed.

Based upon developments in reactor and materials technology and in magnetohydrodynamics, a power system is evolving which appears to have a strong potential for commercial development, coupling a liquid-metal topping cycle with a conventional steam bottoming cycle. The topping cycle consists of a liquid-metal MHD generator tied directly to a liquid-metal-cooled reactor and operating in the temperature range of 1000° F. to 1600° F.

Calculations show that the maximum potential overall efficiency of a binary power cycle as described utilizing an MHD topping cycle and a conventional steam cycle is in the range of 55%, whereas about 40% is the best that can be obtained with present-day steam generators.

The basic energy conversion steps in the liquid-metal MHD cycles that have been proposed include: (1) transfer of heat from the heat source to the liquid, (2) conversion of part of this heat to vapor enthalpy, (3) conversion of the remaining heat to kinetic energy of the liquid, and (4) conversion of most of this kinetic energy into electrical power in the generator.

While several different cycles have been proposed which differ primarily in the manner in which the conversion of thermal energy is achieved, the present invention relies on a conventional approach insofar as steps 1, 2 and 3 are concerned but relates to a new approach to the conversion of kinetic energy to electricity.

It is accordingly an object of the present invention to develop a new apparatus for the conversion of kinetic energy to electricity.

It is a more detailed object of the present invention to develop a simplified liquid-metal MHD generator.

These and other objects of the present invention are attained by producing a thin film of a liquid metal which is flowing rapidly through a magnetic field. To create the rapidly flowing thin film, the effluent of a two-phase nozzle is directed onto a flat surface at an obtuse angle. To accelerate the liquid in the nozzle, a vaporized portion of the liquid metal itself or another component, an inert gas or vapor, may be employed.

The invention will next be described in connection with the accompanying drawing wherein:

FIG. 4 is a vertical cross section taken on the line 4—4 of FIG. 3.

FIG. 5 is a horizontal cross section taken on the line 5—5 of FIG. 3.

Figure 1:
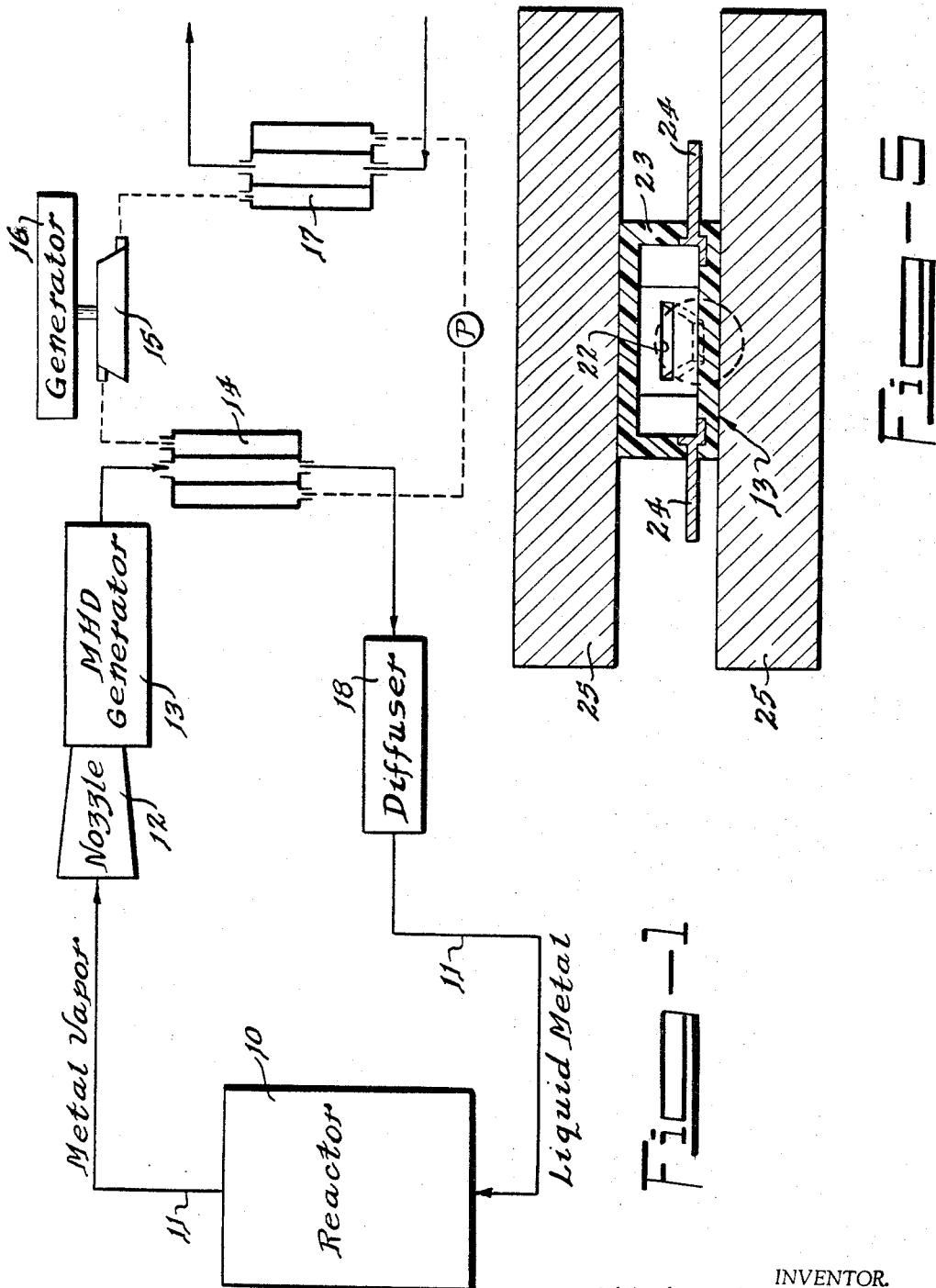
FIG. 1 is a flow diagram of a steam-generating system incorporating the MHD generator according to the present invention.

Referring first to FIG. 1, a nuclear reactor 10 is cooled by a liquid-metal coolant circulating in line 11. Partially vaporized coolant passes from reactor 10 to nozzle 12 which directs the coolant into MHD generator 13 from which electric power is obtained directly. Spent coolant from MHD generator 13 traverses heat exchanger 14 where it gives up its heat to a secondary coolant—which may be water—boiling this water. Steam from heat exchanger 14 operates turbine 15, creating additional electric power in generator 16. After being cooled in waste heat exchanger 17, the water is returned to heat exchanger 14. The cooled liquid metal from heat exchanger 14 passes through diffuser 18 where kinetic energy is transformed to pressure head and the liquid metal is then returned to reactor 10 without necessity for a pump.

Figure 2:
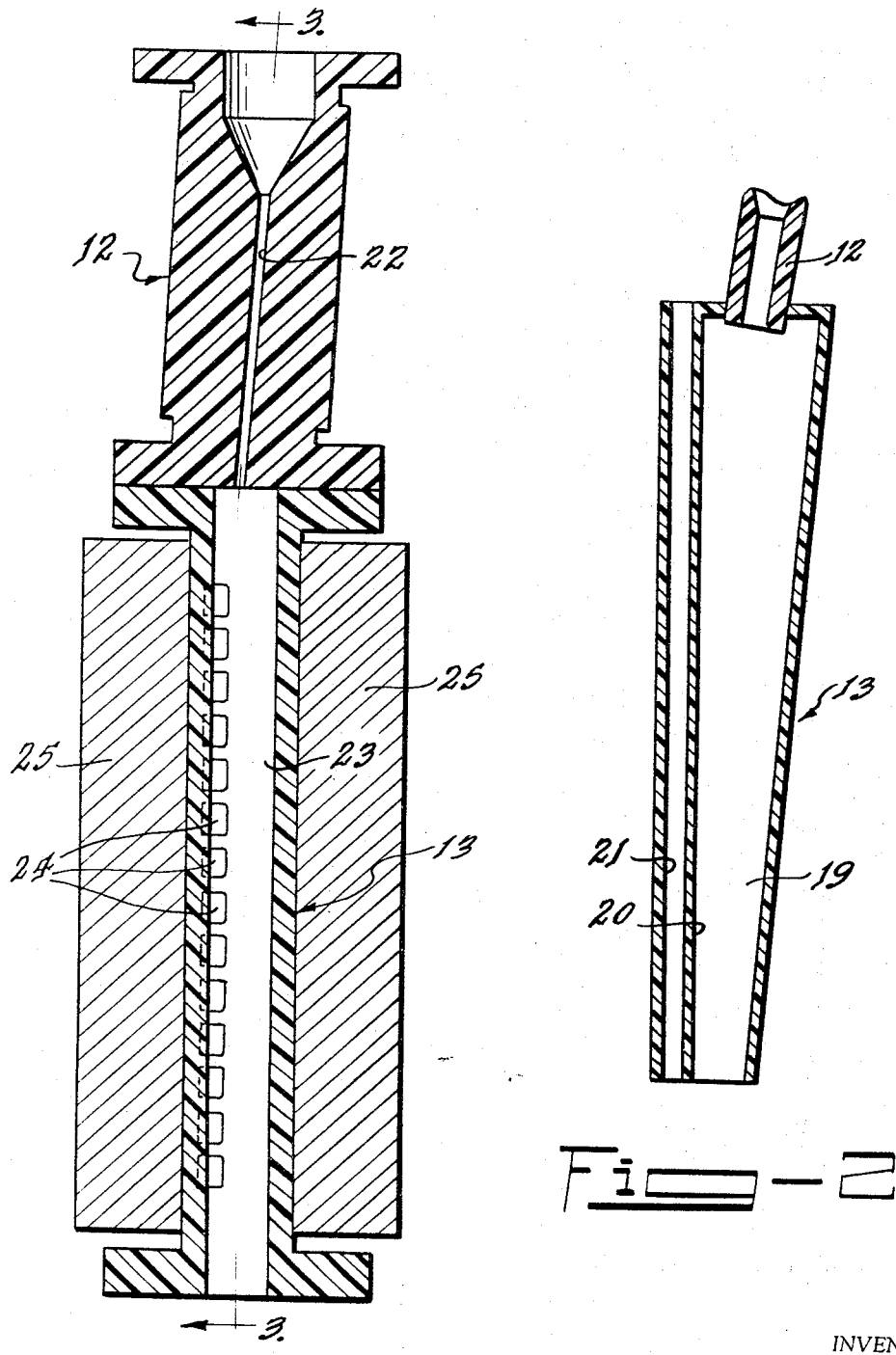
FIG. 2 is a schematic view of the MHD generator.

As shown in FIG. 2, MHD generator 13 comprises a duct 19 having a flat surface 20 and a coolant channel 21 disposed adjacent the surface 20. Nozzle 12 delivers a partially vaporized liquid metal to the duct at an angle of 5 to 7° to surface 20 and the liquid is separated from the vapor by impingement on the surface 20. A rapidly flowing thin film of liquid metal thereby forms on the surface and as electrical energy is extracted the fluid builds up in thickness. Movement of the conducting fluid through the duct 19 when the duct is surrounded by a magnet (not shown) creates an electrical potential which can be harnessed as useful electrical energy.

While dimensions and shape of the nozzle and generator are not critical, the angle between the nozzle and the generator is important, since the nozzle must deliver the liquid metal to the generator in such a way that a thin film flows along one face of the generator duct. Practical limits on this angle are 3 to 12°, while 5 to 7° are preferable.

Figure 3:
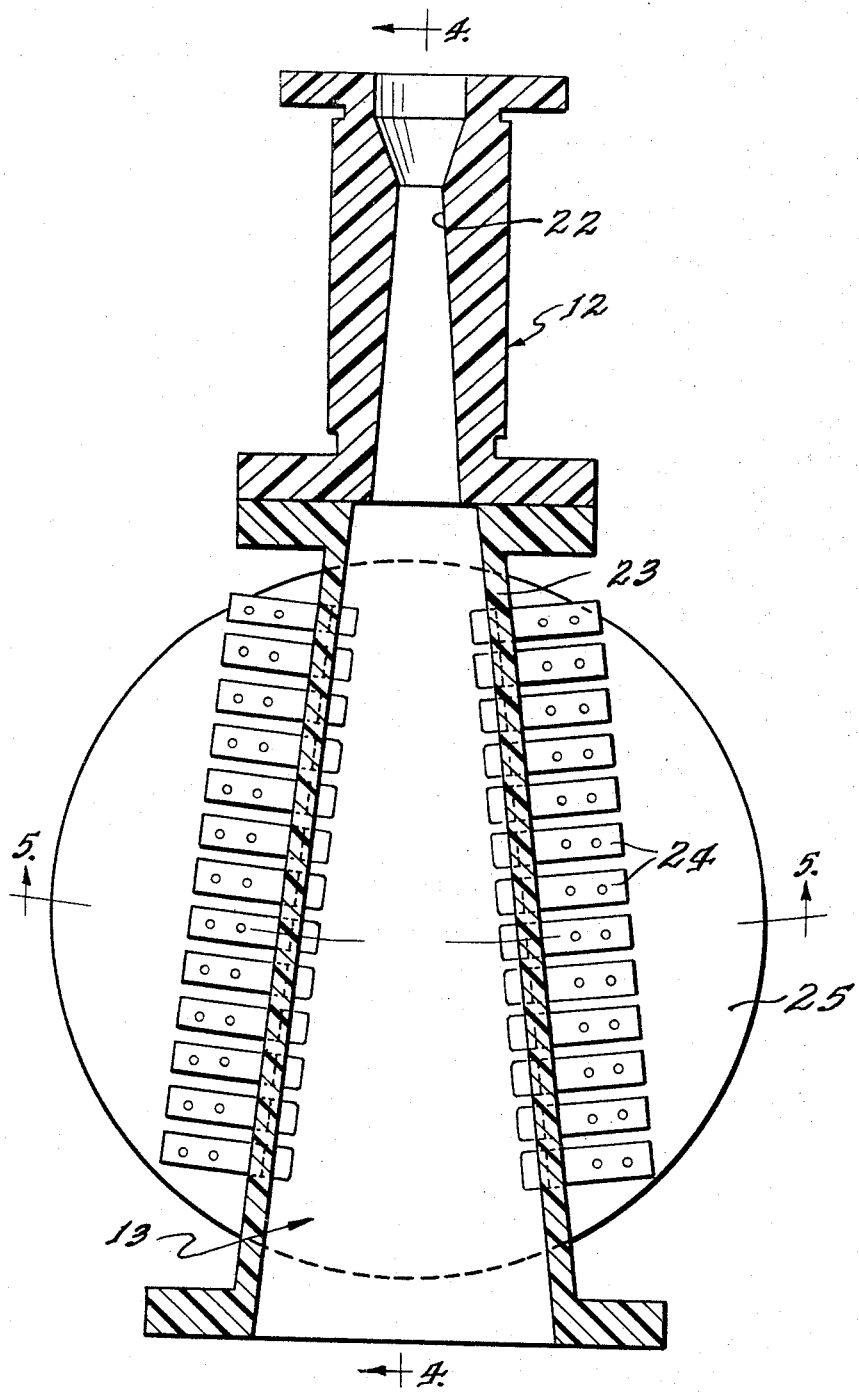
FIG. 3 is a vertical cross section of an experimental version of the MHD generator on line 3—3 of FIGURE 4.

FIGS. 3 and 4 illustrate a MHD generator and nozzle associated therewith which has been constructed to demonstrate operability of this invention. The working fluid is a two-phase mixture of nitrogen and NaK (the eutectic of sodium and potassium) employed at room temperature. Accordingly, both the nozzle and the generator are formed of plastic.

Nozzle 12 is a high aspect ratio nozzle—elongated and of small diameter—in which the aperture contracts rapidly from a circle at the inlet end to rectangular throat 22 and then expands to the outlet end. Nozzle 12 is conventional in nature and need not be further described except in its relationship to MHD generator 13.

MHD generator 13 consists of a vertically disposed flat rectangular duct 23 which is 14 inches long and has an entrance aperture 2.75 inches wide and 1.5 inches deep which expands to 6.75 inches wide by 1.5 inches deep at the exit. A row of metal electrodes 24 is disposed along each side of the duct 23, penetrating the duct so as to be flush with the inner surface of the duct so as to contact the metal film flowing therethrough, and a magnet 25 is disposed at each side of duct 23. The magnet 25 is 16 inches in diameter, pole-faced, with a gap of 2 inches and a rating of 17,500 gauss.

Typical data taken on the performance of the generator during several preliminary runs are listed below. The generator operated stably at field strengths up to 7000 gauss.

RUN NO. 4

Magnetic field strength, 3,200 gauss
Total flow rate, 1.87 lbs./sec.

| Open circuit voltage | | Closed circuit performance | | |
|---|---|---|---|---|
| Electrode pairs | Voltage | Electrode pairs | Voltage | Amperage |
| 1 | .115 | 1 | .073 | 10 |
| 2 | .135 | 2 | .070 | 8.5 |
| 3 | .13 | 3 | .065 | 10 |
| 4 | .13 | 4 | .062 | 6.7 |
| 5 | .12 | 5 | .058 | 7.2 |
| 6 | .11 | 6 | .055 | 6.0 |
| 7 | .10 | 7 | .05 | 5.0 |
| 8 | .097 | 8 | .048 | 4.5 |
| 9 | .090 | 9 | .045 | 3.2 |
| 10 | .085 | 10 | .041 | 5.0 |
| 11 | .080 | 11 | .038 | 4.5 |
| 12 | .070 | 12 | .035 | 5.3 |
| 13 | .065 | 13 | .032 | 9.5 |
| 14 | .060 | 14 | .032 | 5.2 |

It will be understood that the invention is not to be limited to the details given herein but that it may be modified within the scope of the appended claims.

The embodiments of the invention in which an exclusive property or privilege is claimed are defined as follows:

1. A magnetohydrodynamic generator comprising an elongated duct having a flat plate as one side thereof, means for establishing a magnetic field through said duct, means for directing a liquid metal onto said flat plate at an angle of between 3° and 12° and for causing the liquid metal to flow rapidly along the plate as a thin film, and means for collecting the electric current generated thereby.

2. A generator according to claim 1 wherein the liquid metal is a nuclear reactor coolant and means are provided for cooling the duct.

3. A generator according to claim 1 wherein the elongated duct is rectangular in cross section and expands from the inlet end to the outlet end.

4. A generator according to claim 3 wherein said means for directing a liquid metal onto the flat plate is a high aspect ratio nozzle having a circular aperture at the inlet end, which aperture contracts rapidly to a rectangular throat and then expands slowly to the outlet.

5. A generator according to claim 4 wherein said means for establishing a magnetic field comprises a 16-inch, pole-faced magnet with a gap of 2 inches and having a rating of 17,500 gauss.

6. A generator according to claim 5 wherein said means for extracting the electric current comprise a plurality of metal electrodes aligned in rows on each side of the duct so as to contact the film of metal flowing therethrough.

References Cited

UNITED STATES PATENTS 2,583,724  1/1952  Broding _____ 73—194

MILTON O. HIRSHFIELD, *Primary Examiner.*

DAVID X. SLINEY, *Assistant Examiner.*